(12) United States Patent
Friesen

(10) Patent No.: US 6,396,003 B1
(45) Date of Patent: May 28, 2002

(54) SEED WEIGHING AND TRANSPORT TENDER

(75) Inventor: Garry D. Friesen, Storm Lake, IA (US)

(73) Assignee: Friesen of Iowa, Inc., Storm Lake, IA (US)

( * ) Notice: Subject to any disclaimer, the term of this patent is extended or adjusted under 35 U.S.C. 154(b) by 0 days.

(21) Appl. No.: 09/498,283

(22) Filed: Feb. 4, 2000

(51) Int. Cl.[7] .............................................. G01G 19/08
(52) U.S. Cl. ...................................................... 177/136
(58) Field of Search ................................ 177/136, 137, 177/138, 139

(56) References Cited

U.S. PATENT DOCUMENTS

| | | | |
|---|---|---|---|
| 2,793,024 A | 5/1957 | Rose et al. ................... 265/27 |
| 3,990,032 A | 11/1976 | Fish et al. ...................... 338/5 |
| 4,085,850 A | 4/1978 | Heltzel ........................... 214/2 |
| 4,411,325 A | 10/1983 | Hamilton .................... 177/136 |
| 4,905,780 A | 3/1990 | Goff, III ..................... 177/136 |
| 5,199,518 A | 4/1993 | Woodle ....................... 177/211 |
| 5,262,598 A | 11/1993 | Stotler et al. ................ 177/229 |
| 5,811,738 A | 9/1998 | Boyovich et al. ........... 177/136 |
| 5,902,966 A | 5/1999 | VonMuenster ............... 177/136 |
| 6,013,880 A | * 1/2000 | McFarlane et al. ......... 177/139 |
| 6,057,514 A | * 5/2000 | Maguire ...................... 177/105 |

FOREIGN PATENT DOCUMENTS

| | | | | |
|---|---|---|---|---|
| FR | 0141756 A1 | * | 5/1985 | .................. 177/136 |
| FR | 2581602 A1 | * | 11/1986 | .................. 177/136 |
| GB | 2100568 A | * | 1/1983 | .................. 177/136 |

* cited by examiner

*Primary Examiner*—Randy W. Gibson
(74) *Attorney, Agent, or Firm*—McKee, Voorhees & Sease, P.L.C.

(57) ABSTRACT

A combination seed and yield cart is provided for transporting seed to and from the field. The cart includes a hopper with at least one seed compartment and legs for supporting the hopper on a support surface. A load cell is mounted adjacent each of the hopper legs. The hopper is adapted to be removably mounted on a trailer. The load cells are operative when the hopper is mounted on the trailer or on any other support surface. The load cells are free from rotational torque such that the cart can be moved at safe speeds of 50 m.p.h. or more.

17 Claims, 6 Drawing Sheets

SEED WEIGHING AND TRANSPORT TENDER

BACKGROUND OF THE INVENTION

Conventional agricultural seed applications utilize two different carts for transporting seed to the field and from the field. In the spring, a seed cart is used to transport seed to a planter in the field. Normally, a seed cart does not have scales or load cells for weighing seed. In the fall, a yield cart is often used to test sample seeds harvested from the field. The yield cart includes load cells for weighing seed samples. The load cells in prior art yield carts have been mounted in the axles of the trailer. Thus, the load cells are subjected to rotational torque, which limits the speed of the yield cart to approximately 15 m.p.h. The conventional yield cart is not designed to transport harvested seed, but rather collects a relative small sample for testing and then discharges or dumps the tested seed into a larger wagon for transport.

Accordingly, a primary objective of the present invention is the provision of an improved cart which can be used in the spring and the fall for weighing and transporting seed at speeds of 50 m.p.h. or more.

Another objective of the present invention is a combination seed and yield cart which is useful in both the spring and the fall for transporting seed to and from the field and for weighing seed.

A further objective of the present invention is the provision of an improved cart having load cells for weighing seed wherein the cells are not subject to rotational torque.

Another objective of the present invention is the provision of a seed weighing and transport device having a trailer with a hopper removably mounted thereon for weighing and transporting seed.

These and other objections will become apparent from the following description of the invention.

SUMMARY OF THE INVENTION

A combination seed weighing and transport cart includes a trailer adapted to be hitched to a vehicle for towing, and a hopper removably mounted on the trailer. The hopper has one or more compartments for holding seeds and an auger for removing the seeds from the compartment. The hopper is supported on legs. The hopper is portable and includes load cells adjacent each of the legs so that the load cells are functional on any support surface, including the trailer, the ground, a floor, or a bed of a truck. The load cells are sandwiched between the hopper and the support surface, and are free from rotational torque. The hopper is adjustably mounted on the trailer.

DETAILED DESCRIPTION OF THE DRAWINGS

Figure 1:
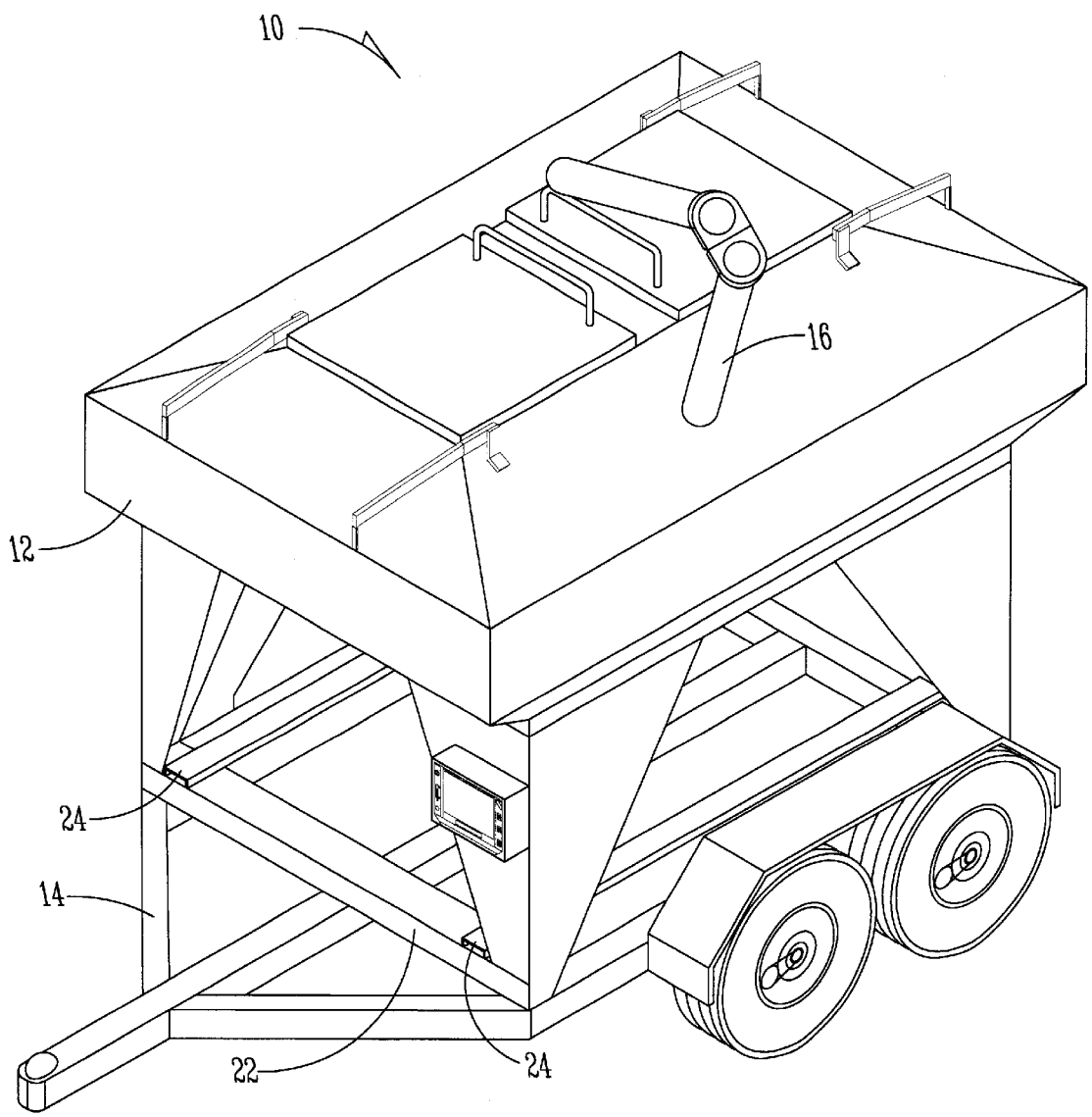
FIG. 1 is a perspective view of the seed weighing and transport device of the present invention.
Figure 2:
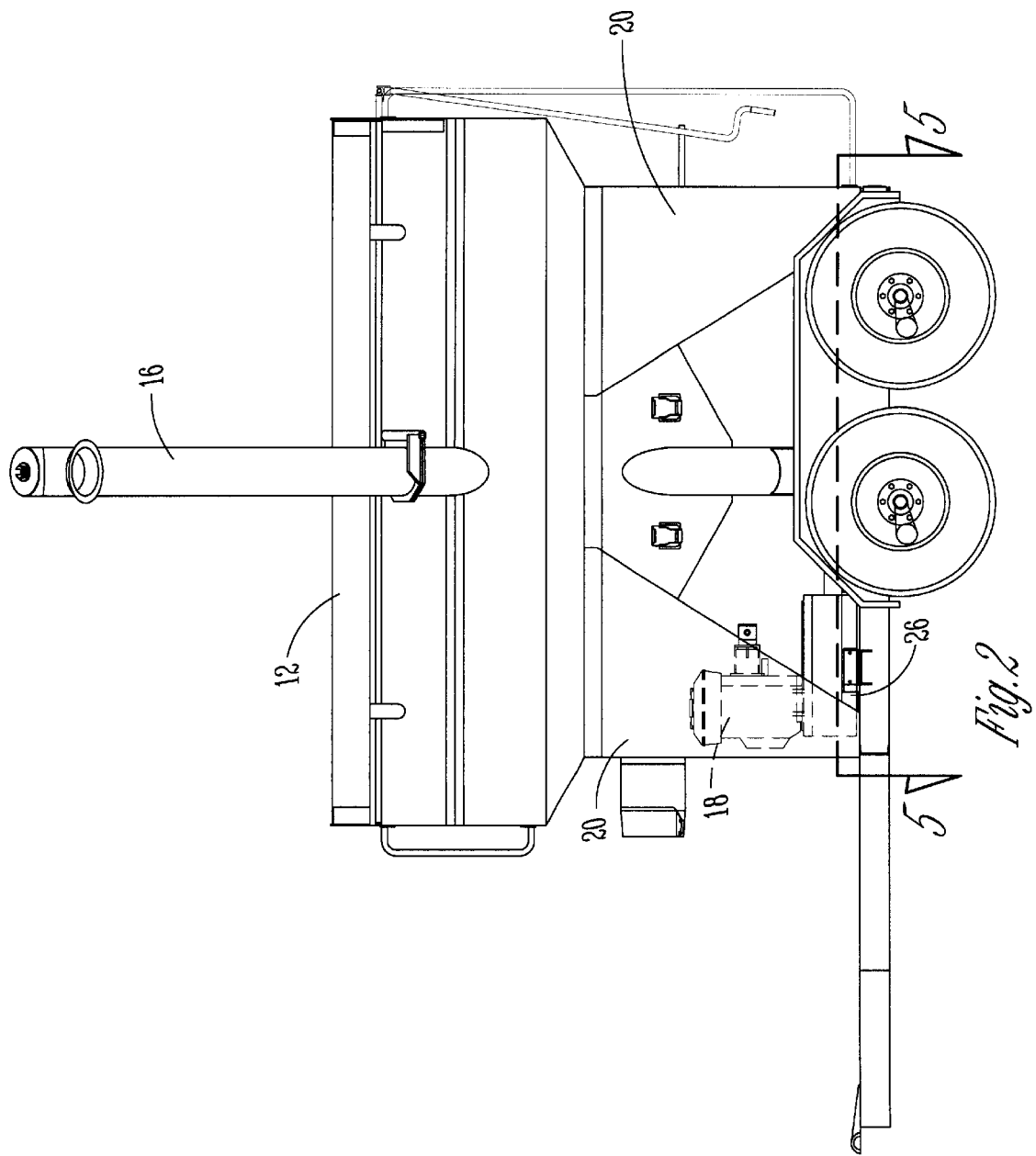
FIG. 2 is a side elevation view of the device.
Figure 3:
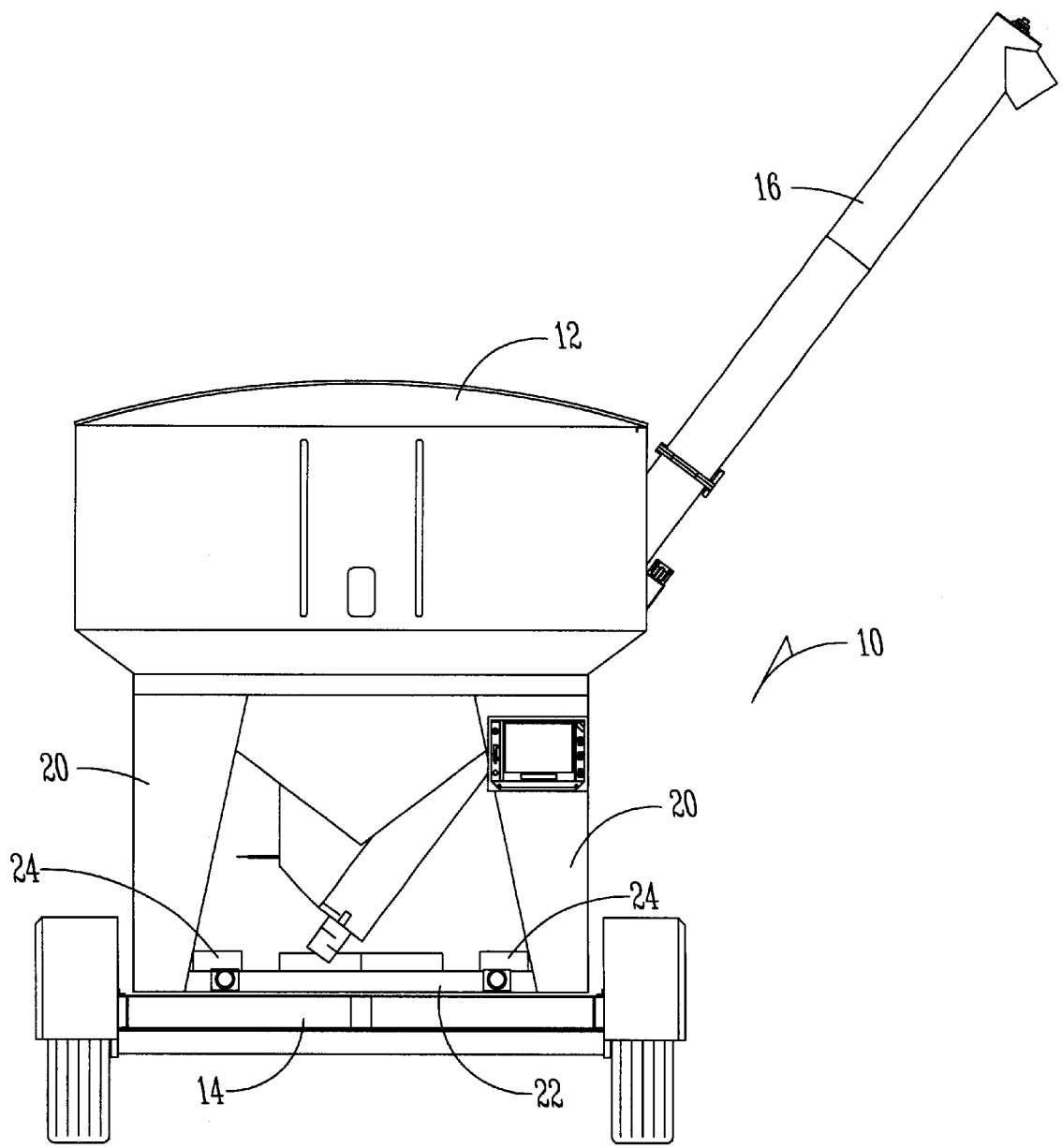
FIG. 3 is a front end elevation view of the device.
Figure 4:
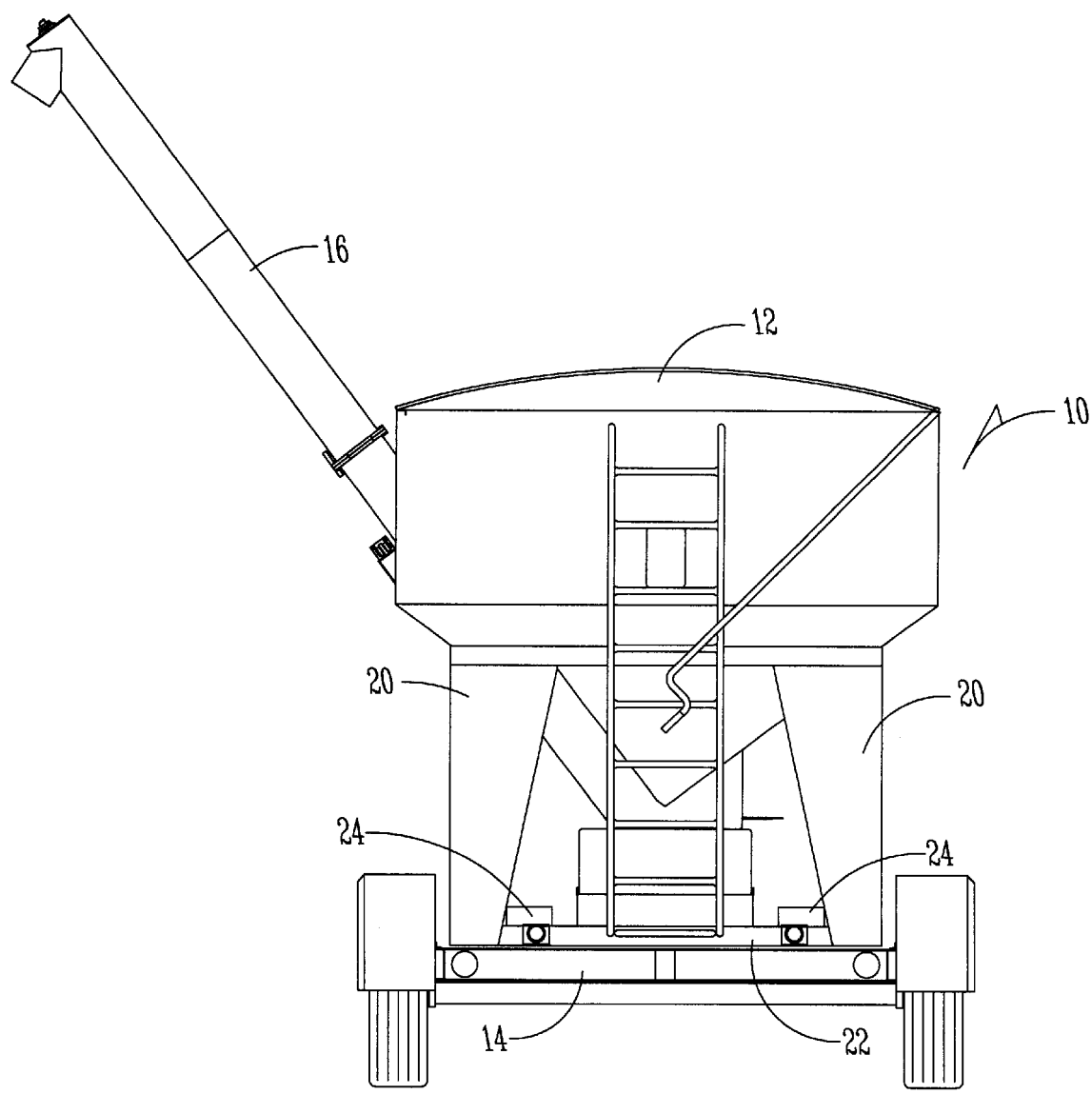
FIG. 4 is a rear end elevation view of the device.

The seed weigh and transport tender device of the present invention is generally designated in the drawings by the reference numeral 10. The device 10 generally includes a cart or hopper 12 and a trailer 14.

The hopper includes an internal compartment for storing seeds. The compartment may be subdivided into two or more compartments for storing different seeds. The compartment or compartments discharge the seed into an auger 16 for removing the seed from the hopper 12 at a desired location. A motor 18 is provided for operating the auger 16. The auger 16 may be foldable with an appropriate hydraulic system for moving the auger between a folded position and a use position.

The hopper 12 is supported by legs 20. A frame 22 interconnects the legs 20. The frame 22 includes channels 24 for receiving the forks of a lift truck, such that the hopper 12 is portable and can be moved to and from the trailer 14.

A load cell 26 is fixed on the hopper frame 22 adjacent each of the legs 20. Thus, preferably, four load cells 26 are provided on the device 10. The load cells 26 are sandwiched between the hopper frame 22 and a support surface, such as the crossbars 28 of the trailer 14, the bed of a truck, a floor, or the ground.

Figure 5:
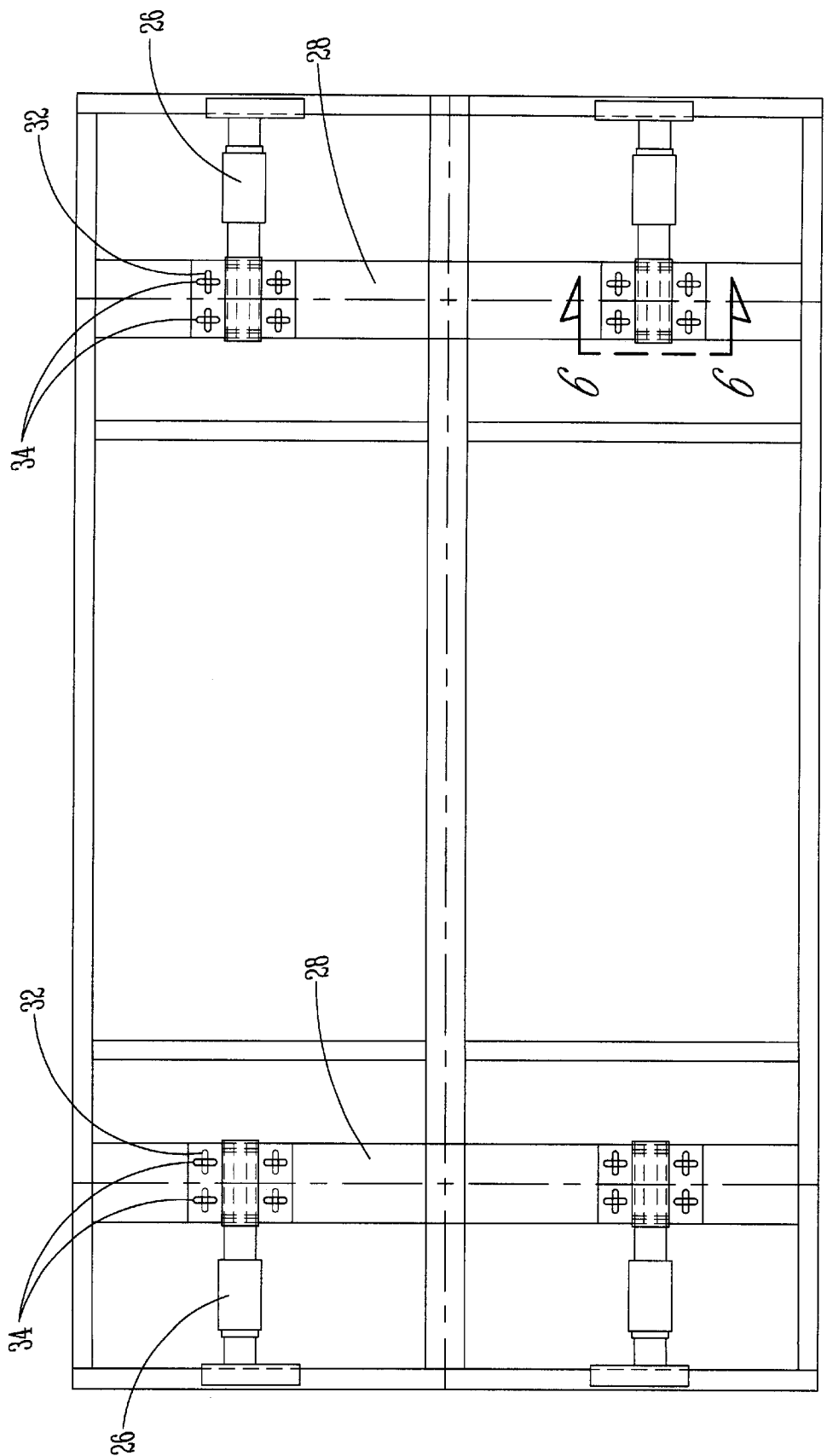
FIG. 5 is a plan view taken along lines 5—5 of FIG. 2.
Figure 6:
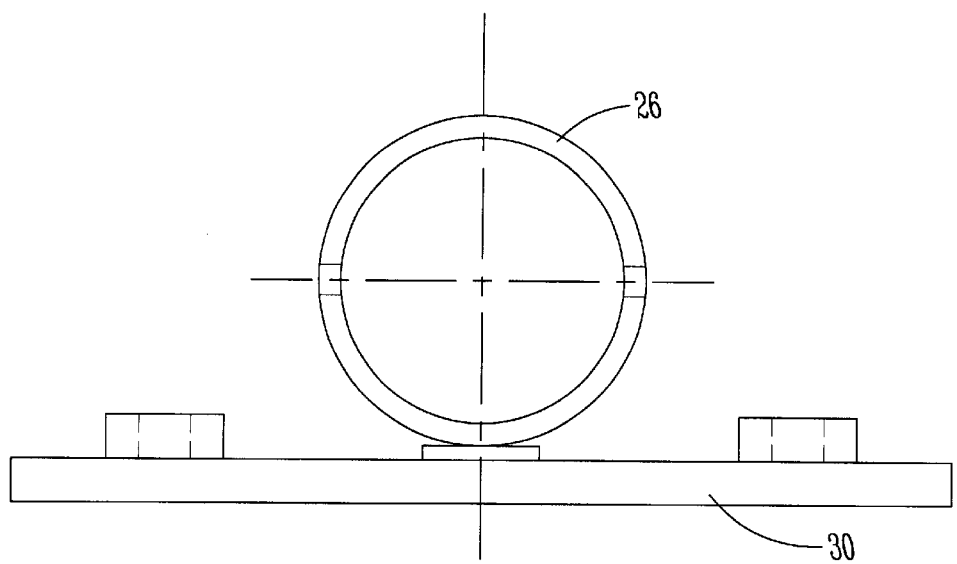
FIG. 6 is an elevation view taken along lines 6—6 of FIG. 5.
Figure 7:
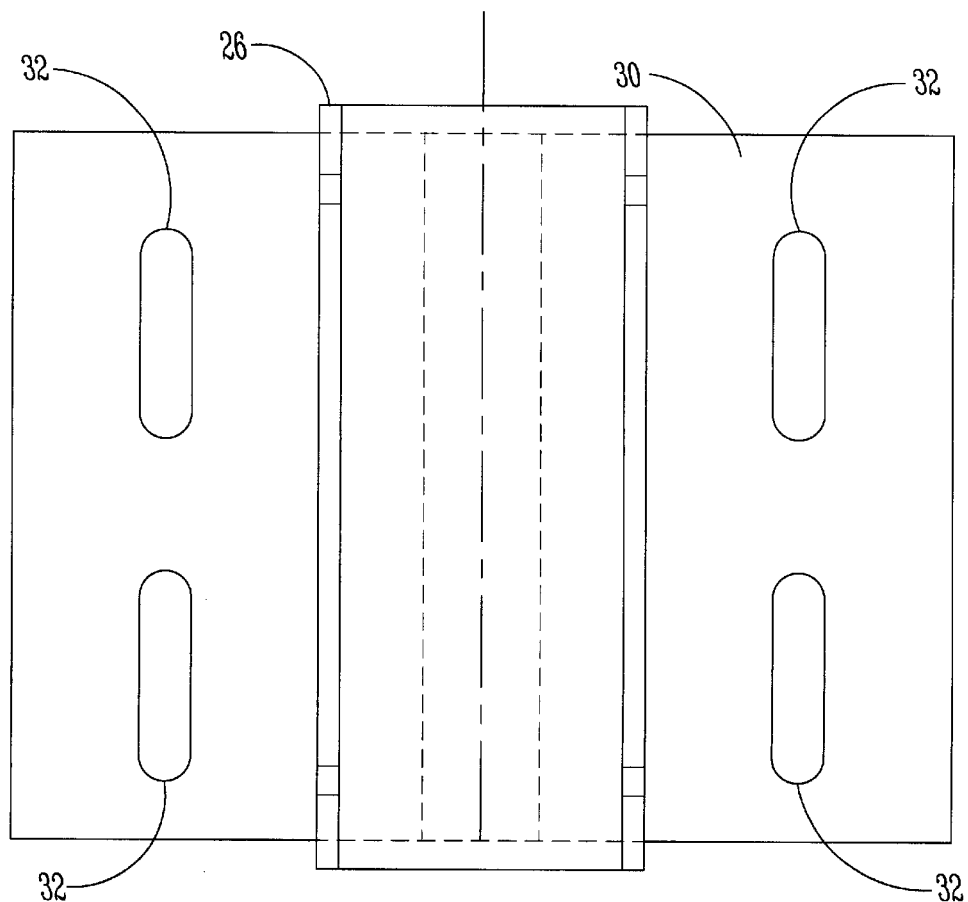
FIG. 7 is a view taken along lines 7—7 of FIG. 6.

As best seen in FIG. 5, the hopper 12 is adapted to be removably mounted on the trailer 14 via mounting brackets 30. The mounting brackets 30 are permanently fixed to the hopper 12. One of the load cells 26 is fixed on each of the mounting brackets 30, as seen in FIGS. 6 and 7. The brackets 30 each include an elongated slot 32 extending longitudinally relative to the longitudinal axis of the trailer 14. The crossbars 28 of the trailer 14 have elongated slots 34 which extend laterally relative to the longitudinal axis of the trailer. Thus, the slots 32, 34 can be aligned with longitudinal and lateral adjustability of the hopper 12 relative to the trailer 14. A conventional fastener, such as a nut and bolt assembly, is used to removably secure the mounting brackets 30 of the hopper 12 on the crossbars 28 of the trailer 14.

The removable connection between the hopper 12 and the trailer 14 enhances the versatility of the hopper. For example, the hopper 12 can be mounted on the trailer 14 or in the bed of a pickup truck to serve as a seed cart in the spring to deliver seed to a planter in the field. Since the load cells 26 are not subjected to rotational torque, safe speeds of at least 50 m.p.h. can be maintained without damage to the load cells.

Similarly, in the fall, the hopper 12 can be mounted on the trailer 14 or placed in the bed of a pickup truck and taken into the field to receive harvested seed samples for weighing. When the hopper 12 is not needed, it can be removed from the trailer 14 such that the trailer can be used for other needs.

Thus, the device of the present invention is useful as a combination seed and yield cart, with the hopper 12 being portable for use on the trailer 14 or on other support surfaces.

The preferred embodiment of the present invention has been set forth in the drawings and specification. Although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A seed weighing and transport device, comprising:
   a trailer adapted to be hitched to a vehicle;
   a hopper removably mounted on the trailer, the hopper having at least one compartment for holding seeds, an auger for removing seeds from the compartment, and a plurality of legs;

a weighing system removably mounted on the trailer and sandwiched between the trailer and the hopper to weigh the seed in the hopper when the hopper and the weighing system are in a trailer mounted position; and the weighing system adapted to weigh the seed in the hopper when the weighing system and the hopper are removed from the trailer.

2. The device of claim 1 wherein the weighing system includes a plurality of load cells with one load cell being adjacent each leg of the hopper.

3. The device of claim 2 wherein the hopper includes a frame extending between the legs and the load cells are mounted on the frame.

4. The device of claim 3 wherein the frame is adjustably mounted to the trailer.

5. The device of claim 1 wherein the hopper has two compartments for seed.

6. The device of claim 1 wherein the weighing system is free from rotational torque when the trailer and hopper are moved by the vehicle.

7. The device of claim 1 wherein the hopper is laterally and longitudinally adjustable with respect to the trailer.

8. The device of claim 1 wherein the trailer includes laterally extending slots and the hopper includes longitudinally extending slots, with pairs of the lateral and longitudinal slots overlapping to receive bolts and thereby allow adjustable mounting of the hopper on the trailer.

9. A combination seed and yield cart for transporting seed to and from a field, comprising:

a hopper with at least one seed compartment and a plurality of legs for supporting the hopper;

a load cell mounted adjacent each leg of the hopper;

a trailer adapted to be towed by a vehicle;

hopper being removably mounted on the trailer; and the load cells being operative when the hopper is mounted on the trailer and when the hopper is removed from the trailer and sitting on another support surface.

10. The cart of claim 9 wherein the load cells are free from rotational torque.

11. The cart of claim 9 wherein the hopper includes mounting brackets for adjustably mounting the hopper on the trailer.

12. The cart of claim 9 wherein the hopper and the trailer both include slots which extend perpendicular to one another and overlap so as to receive mounting bolts to adjustably secure the hopper on the trailer.

13. The cart of claim 9 wherein the load cells are fixed to the hopper for movement with the hopper when the hopper is removed from the trailer.

14. The cart of claim 9 wherein the trailer includes an axle with wheels, the load cells being spaced from the axle so as to preclude any rotational torque on the load cells.

15. A combination seed and yield cart for transporting seed to and from a field comprising:

a chassis adapted to be towed by a vehicle;

a hopper adapted to be removably attached to the chassis, the hopper having at least one compartment for holding seed, an auger for removing seed from the compartment, and a plurality of legs; and a weighing system mounted to the hopper capable of weighing the seed when the hopper is attached to the chassis and when the hopper is removed from the chassis.

16. The combination seed and yield cart of claim 15 wherein the hopper includes a frame extending between the legs and the weighing system is mounted on the frame.

17. The combination seed and yield cart of claim 16 wherein the weighing system is free from rotational torque when the chassis and hopper are moved by the vehicle.

* * * * *